United States Patent [19]

Arterburn

[11] Patent Number: 4,644,977
[45] Date of Patent: Feb. 24, 1987

[54] HOSE WITH COEXTRUDED COVER CONSISTING OF MULTIPLE FOAMED OR NONFOAMED LAYERS

[75] Inventor: Robert B. Arterburn, Littleton, Colo.
[73] Assignee: The Gates Rubber Company, Denver, Colo.
[21] Appl. No.: 715,542
[22] Filed: Mar. 25, 1985
[51] Int. Cl.⁴ .............................................. F16L 9/14
[52] U.S. Cl. ..................................... 138/137; 137/125
[58] Field of Search .............................. 138/124–126, 138/137, 140, 141, 146, DIG. 9

[56] References Cited

U.S. PATENT DOCUMENTS

| | | | |
|---|---|---|---|
| Re. 31,047 | 10/1982 | Ross | 138/126 |
| 3,130,753 | 4/1964 | Monnen | 138/138 |
| 3,289,703 | 12/1966 | Brown | 138/125 |
| 3,547,162 | 12/1970 | Schaerer | 138/137 |
| 3,561,493 | 2/1971 | Maillard | 138/137 |
| 3,599,677 | 8/1971 | O'Brien | 138/125 |
| 3,805,848 | 4/1974 | Chrow | 138/137 |
| 3,811,477 | 5/1974 | Thawley | 138/137 |
| 3,869,338 | 5/1975 | Kavesh | 138/137 |
| 3,902,531 | 9/1975 | Thawley | 138/137 |
| 3,927,695 | 12/1975 | Crockwell | 138/137 |
| 3,957,085 | 5/1976 | Ball | 138/137 |
| 3,994,761 | 11/1976 | Higbee | 138/144 |
| 4,044,799 | 8/1977 | Higbee et al. | 138/125 |
| 4,091,063 | 5/1978 | Logan | 138/122 |
| 4,148,342 | 4/1979 | Welsby | 138/144 |
| 4,153,079 | 5/1979 | Ambrose | 138/137 |
| 4,154,266 | 5/1979 | Tanaka et al. | 138/DIG. 9 |
| 4,196,464 | 4/1980 | Russell | 138/125 |
| 4,243,075 | 1/1981 | McPherson et al. | 138/125 |
| 4,273,160 | 6/1981 | Lowles | 138/126 |
| 4,322,260 | 3/1982 | Conlon | 138/126 |
| 4,351,366 | 9/1982 | Angioletti | 138/137 |
| 4,380,252 | 4/1983 | Gray et al. | 138/125 |
| 4,603,712 | 5/1986 | Krause | 138/137 |

FOREIGN PATENT DOCUMENTS 922116  3/1963  United Kingdom ......... 138/DIG. 9

OTHER PUBLICATIONS

*Modern Plastics*, Nov. 1978, p. 78, J. Zechinati.

*Primary Examiner*—Stephen Marcus
*Assistant Examiner*—Leo James Peters
*Attorney, Agent, or Firm*—C. H. Castleman, Jr.; H. W. Oberg, Jr.; Frank P. Grassler

[57] ABSTRACT

A reinforced, lightweight, flexible hose that is also abrasion and stain resistant. The hose properties, because of the component nature of the hose, can be varied to provide the most durable and economical hose for a specific application.

16 Claims, 6 Drawing Figures

HOSE WITH COEXTRUDED COVER CONSISTING OF MULTIPLE FOAMED OR NONFOAMED LAYERS

BACKGROUND OF THE INVENTION

This invention relates to flexible hoses consisting of foamed layers protected by a nonfoamed or less-foamed outer cover and an inner tube. Prior technology teaching the coextrusion of multiple layers of foamed, plastic material to make flexible, lightweight hose is shown in U.S. Pat. No. 4,044,799 to Higbee et al, and in U.S. Pat. No. 3,547,162 to Schaerer et al. The foaming of the material also improves the economics because it reduces the density, using less material per unit length.

However, this hose is not without its disadvantages. It has been noted that a foamed hose cover is not as resistant to staining or abrasion. The porous nature of the cover makes it particularly susceptible to staining, making the hose look worn long before the end of its useful like.

It is known in the art that a thin nonfoamed layer may also be applied to the inside of the tube. With a nonporous, thin skin acting as a liner, it isn't necessary to be concerned with the porosity of the foamed layers from a permeability standpoint, because the skin insulates the foamed layers from the fluid by serving as a permeability barrier.

SUMMARY OF THE INVENTION

The solution to the abrasion and staining problems associated with foamed cover hoses is the application of a thin, nonfoamed or substantially less-foamed cover layer over the outermost foamed layer. This cover layer, because it is quite thin, allows the hose to retain its lightweight character, yet provides the hose with the abrasion and stain resistance necessary to maximize its useful life.

The economics of this hose is enhanced by the option of foaming the outer cover and the inner liner, but not foaming the outer cover to the same extent as the foamed interlayers. If the service doesn't require maximum abrasion resistance, the cover can be foamed slightly and still protect the interlayers. Less material per unit length is necessary to provide this protection, resulting in cost savings.

Another advantage from using a thin, nonfoamed (or substantially less-foamed) layer on the inner and outer surfaces of the hose is the cost savings, resulting from the ability to foam the interlayers to an even greater extent. Since the inner liner protects the interlayers from contact with the fluid flowing through the hose, and the outer cover insulates the interlayers from contact with material outside the hose, permeability of the interlayers is no longer a major concern. The interlayers can be foamed without regard to the possibility that the fluids will permeate the foamed layers because of excessive porosity.

Still another advantage of the use of multiple layers is the ability to use multiple materials. The thin cover (or inner liner) material can be made of any compatible thermoplastic material. The thin outer or inner layers are not required to be made of the same material as the foamed interlayers. This allows selection of the material used for the foamed interlayers to be based on the flexibility and resiliency of the material, whereas the surface materials can be chosen for toughness, chemical inertness, etc.

The combination of the different layers also preserves and enhances the lightweight nature of the hose. Because of the tougher outer skin, less material is used overall. Consequently, the combination cover weighs significantly less per unit length than the single-component foamed cover.

BRIEF DESCRIPTION OF THE DRAWINGS

Certain preferred forms of the invention will be described with reference to the accompanying drawings, wherein like numerals designate like parts, and in which.

PREFERRED EMBODIMENTS

The principal problem with the foamed covers of previous hose constructions has been poor durability and stain resistance. Yet, the trade-off for tougher covers has been increased hose weight. By applying a thin, nonfoamed skin 16 on top of (radially outwardly of) a foamed layer 14 and telescoping those over a reinforced tube, the durability of the hose is increased while the hose retains its lightweight character.

Figure 2:
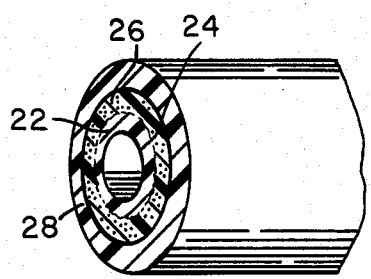
FIG. 2 is a cross-section of another embodiment showing a three layer hose with a foam interlayer.
Figure 4:
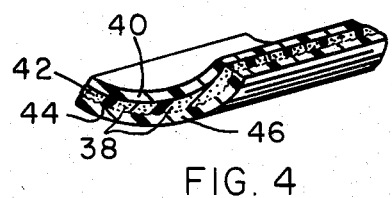
FIG. 4 is a perspective wall section of a three layered hose with one foamed interlayer in accordance with the invention.

The tube can consist of the inner liner 18 and a foamed interlayer 20 plus reinforcement 12. The reinforcement 12 can be placed between any two layers, or if the tube is not set, the reinforcement will be embedded in the foamed interlayer 20. Also, the tube can simply be the thin inner liner 22 (see FIG. 2) plus reinforcement 24, the cover still consisting of a foamed interlayer 26 and a thin outer cover 28. FIG. 4 illustrates that the reinforcement 44 can be placed about foamed interlayer 42 as well. Suitable tube materials (as shown at 40) include any natural or synthetic rubber as well as thermoplastic materials.

The outer cover (as shown at 16, 28, 46 and 50 can be made of any compatible thermoplastic material such as polyethylene, EVA, polyvinylchloride, or nylon. The outer cover material does not have to be the same as the material used for the foamed interlayers, but merely compatible with it. Therefore, the interlayers may consist of any material used for the cover or tube.

The reinforcement 12 can be of any desired configuration such as knit, spiral, or braid; and made of nylon, polyester, or any textile material. The knit fabric or other reinforcement may be separately applied between the inner cover layer 14 and the outer tube layer 20 thereby increasing the strength of the conduit. This is done by first forming the seamless, nonfoamed innermost tube layer 18 and the seamless, closed cell outer tube layer 20, placing the knit 12 or braid thereover and subsequently applying the inner and outer cover layers 14 and 16. This is done by passing the reinforced tube through a die as shown in FIG. 6 having decreasing volume with a correspondingly increasing pressure gradient to form the layers thereover.

Figure 5:
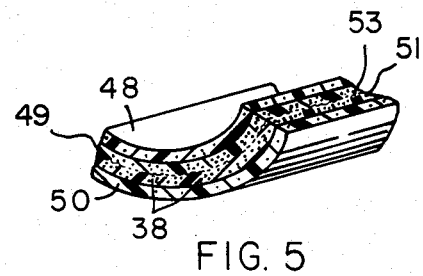
FIG. 5 is a wall section of a four layer hose of the invention with all four layers foamed, though the outer and inner layers are foamed to a substantially lesser extent.

All layers of the hose are capable of being foamed, thereby maximizing the cost-effectiveness by minimizing the material used per length of hose. Note, however, FIG. 5 illustrates that the inner liner 48 and outer cover 50 are not foamed to the extent of the interlayer(s) 49, 51, which sandwich the interposed reinforcement 53. The density reduction of the cover from its nonfoamed state is in fact limited to two-thirds the density reduction of the foamed interlayer(s) from its nonfoamed state to insure that the outer layer is impermeable to fluids since it consists of a closed cell structure composed of closed air pockets. Foaming by use of a blowing agent such as axodicarbonamide causes tiny closed air pockets (see 38 for example) to be dispersed throughout the material increasing the volume and thereby decreasing the density.

Figure 6:
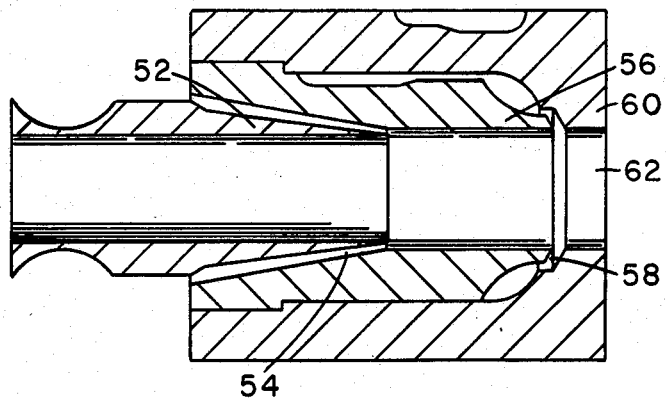
FIG. 6 is a die used to extrude a cover consisting of a foamed interlayer and a thin outer cover onto a reinforced tube.

The die used in the extrusion process is illustrated in FIG. 6. The reinforced tube is passed from left to right through passage 62, and the two layer cover is extruded onto the tube. The foamed interlayer portion of the cover is extruded onto the tube through passage 54 of the die. The nonfoamed or less-foamed thin cover is extruded onto the foamed interlayer through die cavity 58. It is important when dealing with material impregnated with a blowing agent to keep increasing the pressure until the hose exits the die. This is done by the use of a tapered die pin 52. As the plastic with blowing agent is placed on the hose, it is allowed to expand prior to the application of the outer cover through die cavity 58. Note that the die cavity 58 is substantially narrower than die cavity 54 indicating the difference in the thickness between the two layers. The hose outer cover layer is thinner than the foamed interlayer portion of the cover. In all applications, the thickness of the outer cover varies from 15% to 73% of the thickness of the foamed interlayer. In those applications where the outer cover layer is nonfoamed, the thickness of the outer cover varies from 15% to 50% of the thickness of the foamed interlayers. In specific applications the outer cover thickness varies from 15% to 37% of the thickness of the foamed interlayer.

A similar die may be used for extruding the tube portion prior to the application of the reinforcement. The only differences are a smaller internal die cavity 62 adjusted to the internal diameter of the hose desired, and the extrusion of the blown layer atop the thin inner liner.

It should be noted that the various layers of the hose, including the reinforcement, may be bonded to each other using a variety of adhesives or treatments depending on the hose properties desired. Since the techniques and substances used for bonding are varied and tailored for a specific application, it should be obvious to one skilled in the art that the invention should not be limited to a speific method for adhering the layers to each other or the reinforcement.

The following examples are illustrated merely to highlight the preferred embodiments and are in no way intended to limit the invention.

EXAMPLE 1

Figure 1:
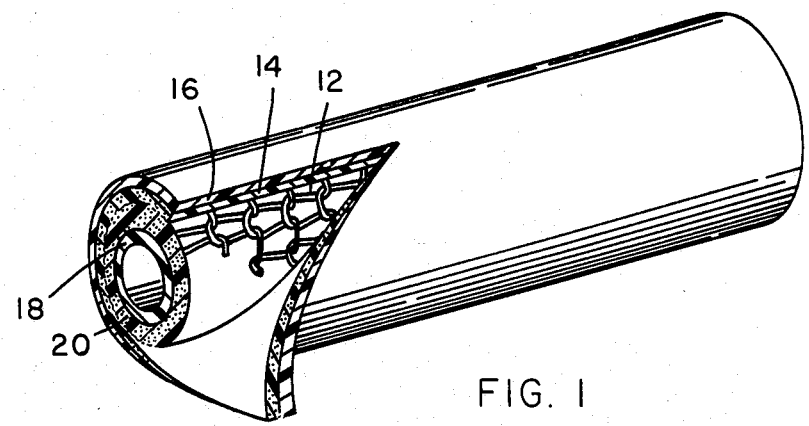
FIG. 1 is a cut away section of a multiple layer hose with reinforcement placed between the two foam layers in accordance with one aspect of the invention, the embodiment representing a hose with diameter $\frac{5}{8}$ inch or less.

The hose as illustrated in FIG. 1 has four distinct layers. The hose has an inner diameter of ⅝ inch or less. The inner tube 18 is a nonfoamed layer of PVC having a 0.015 inch thickness and specific gravity of 1.3. The second layer 20 is a foamed layer of PVC having a 0.04 to 0.06 inch thickness and a reduced specific gravity of 0.8, which is a 38% reduction in density.

The reinforcement 12 is a polyester knit and is applied on top of the dual layer coextruded tube. The foamed layer 14, applied directly atop the reinforcement and coextruded with the nonfoamed outer cover 16, is made of PVC and has a thickness of 0.03 to 0.07 inch and a specific gravity of 0.8, which is a 38% reduction in density. The nonfoamed outer cover 16 is made of PVC, and it has a thickness of 0.015 to 0.022 inch thickness and a specific gravity of 1.3. The outer cover thickness varies from 21% to 73% of the thickness of the foamed interlayer.

EXAMPLE 2

Figure 3:
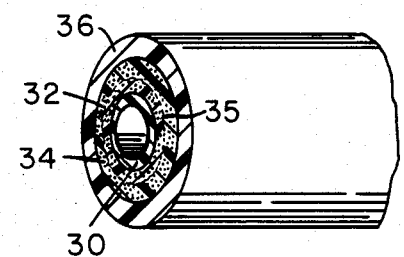
FIG. 3 is a cross-section of another embodiment showing a four layer hose with two foam interlayers, the embodiment representing a hose with diameter greater than $\frac{5}{8}$ inch.

This example, as illustrated in FIG. 3, has 4 distinct layers. The inner diameter, however, is greater than ⅝ inch. The inner tube 30 is, again, a nonfoamed layer of PVC having a 0.015 inch thickness and a specific gravity of 1.3. The second layer 32 is a foamed PVC layer of 0.06 to 0.095 inch thickness and a specific gravity of 0.86, a 34% reduction in density.

The reinforcement 35, a polyester knit, is applied on top of the two layer coextruded tube. The foamed PVC layer 34 applied directly atop the reinforcement and coextruded with the nonfoamed PVC layer of the cover 36 has a thickness of 0.06 to 0.1 inch, substantially thicker than the layer in example 1, and a specific gravity of 0.8, a 38% reduction in density. The nonfoamed cover, again, has a thickness of from 0.015 to 0.022 inch. The outer cover thickness varies from 15% to 37% of the thickness of the foamed interlayer.

In all applications the materials used can be varied. Thermoplastic materials such as polyvinyl chloride, polyethylene, EVA, nylon, Hytrel ®, and urethane are all acceptable. The hose may be comprised of one material or it can be varied from layer to layer. In the above examples, the coextruded hose constructions average 2.33 pounds lighter per 100 ft., making them approximately 14% lighter than hose consisting of a single-layer foamed tube and a single-layer foamed cover.

It will be understood that the invention is capable of a variety of modifications and variations, which will become apparent to those skilled in the art upon a reading of this specification, the scope of the invention being defined by the appended claims.

What is claimed is:
1. A hose comprising:
   a two-component tube consisting of a thin, non-foamed inner liner and a foamed interlayer circumferentially encompassing the inner liner;
   a textile reinforcement telescoped over said tube; and
   a two-component, coextruded, thermoplastic outer cover layer circumferentially encompassing said reinforced tube and having a first thermoplastic layer with a multitude of closed gas-filled cells and interposed between the tube and a second thermoplastic layer which is nonfoamed and has a thick- ness of from 15% to 73% of the thickness of the first thermoplastic layer, the coextruded first and second thermoplastic layers being free of any intervening material.

2. The hose of claim 1 wherein the second layer has a thickness of from 15% to 50% of the first layer.

3. The hose of claim 1 wherein the second layer has a thickness of from 15% to 37% of the thickness of the first layer.

4. A lightweight hose comprising:
a tube;
a textile reinforcement telescoped over said tube; and
a multilayer coextruded thermoplastic cover distinct from the tube and disposed radially outwardly of the reinforcement including an outer cover layer formed of stain and abrasion resistant nonfoamed thermoplastic material, and an inner cover layer formed of a foamed thermoplastic material, the outer cover layer having an annular thickness which is substantially less than the annular thickness of the inner cover layer, and the outer and inner cover layers being in direct contact with one another along their mutual interface and free of any intervening material.

5. The hose of claim 4 wherein the outer cover layer has a thickness of from 15% to 73% of the thickness of the inner cover layer.

6. The hose of claim 4 wherein the outer cover layer has a thickness of from 15% to 37% of the thickness of the inner cover layer.

7. The hose of claim 4 wherein the inner cover layer is selected from the group consisting of polyethylene, EVA, polyvinylchloride, and nylon, and the outer cover layer is selected from the group consisting of polyethylene, EVA, polyvinylchloride, and nylon.

8. The hose of claim 7 wherein the inner cover layer and outer cover layer are formed of polyvinylchloride.

9. The hose of claim 4 consisting essentially of the three elements recited, and the cover consists essentially of the inner and outer cover layers as recited.

10. The hose of claim 4 wherein the inner cover layer is formed with a multitude of closed gas-filled cells dispersed throughout such inner cover layer.

11. A lightweight hose comprising:
a tube;
a textile reinforcement telescoped over said tube; and
a multilayer coextruded thermoplastic cover distinct from the tube and disposed radially outwardly of the reinforcement including an outer cover layer formed of foamed thermoplastic material, and an inner cover layer formed of a foamed thermoplastic material, the outer cover layer being foamed to a substantially lesser extent and having a substantially greater density than the inner cover layer, the outer cover layer having an annular thickness which is substantially less than the annular thickness of the inner cover layer, and the outer and inner cover layers being in direct contact with one another along their mutual interface and free of any intervening material.

12. The hose of claim 11 wherein the inner cover layer is selected from the group consisting of polyethylene, EVA, polyvinylchloride, and nylon, and the outer cover layer is selected from the group consisting of polyethylene, EVA, polyvinylchloride, and nylon.

13. The hose of claim 11 wherein the difference of the foamed density of the outer cover layer from its density in a nonfoamed state does not exceed two-thirds the difference of the foamed density of the inner cover layer from its density in a nonfoamed state.

14. A lightweight thermoplastic hose comprising:
a two-component tube consisting of a thin, nonfoamed thermoplastic inner liner and a foamed interlayer circumferentially encompassing the inner liner and making direct contact therewith;
a textile reinforcement telescoped over said tube; and
a two-component coextruded, thermoplastic cover distinct from the tube and disposed radially outwardly of the reinforcement including an outer cover layer forming the radially outermost layer of the hose and formed of nonfoamed thermoplastic material, and an inner cover layer formed of a foamed thermoplastic material having a multitude of closed gas-filled cells dispersed throughout such inner cover layer, the outer cover layer having an annular thickness which is substantially less than the annular thickness of the inner cover layer, the outer and inner cover layers being formed of compatible thermoplastic material selected from the group consisting of polyethylene, EVA, polyvinylchloride, and nylon, and the outer and inner cover layers being in direct contact with one another along their mutual interface and free of any intervening material.

15. The hose of claim 14, wherein the outer cover layer has a thickness of from 15% to 73% of the thickness of the inner cover layer.

16. The hose of claim 14, wherein the outer cover layer has a thickness of from 15% to 37% of the thickness of the inner cover layer.

* * * * *